(12) United States Patent
Rittinge et al.

(10) Patent No.: US 12,577,778 B2
(45) Date of Patent: Mar. 17, 2026

(54) WOOD FIBRE BASED PANEL AND A METHOD FOR OBTAINING SUCH PANEL

(71) Applicant: Välinge Innovation AB, Viken (SE)

(72) Inventors: Rickard Rittinge, Förslöv (SE); Sofia Nilsson, Jonstorp (SE)

(73) Assignee: VÄLINGE INNOVATION AB, Viken (SE)

( * ) Notice: Subject to any disclaimer, the term of this patent is extended or adjusted under 35 U.S.C. 154(b) by 959 days.

(21) Appl. No.: 17/769,594

(22) PCT Filed: Oct. 19, 2020

(86) PCT No.: PCT/SE2020/050999
§ 371 (c)(1),
(2) Date: Apr. 15, 2022

(87) PCT Pub. No.: WO2021/076047
PCT Pub. Date: Apr. 22, 2021

(65) Prior Publication Data
US 2025/0129606 A1     Apr. 24, 2025

(30) Foreign Application Priority Data

Oct. 18, 2019     (SE) ..................................... 1930330-4

(51) Int. Cl.
*E04C 2/16*          (2006.01)
*B32B 7/12*          (2006.01)
(Continued)

(52) U.S. Cl.
CPC .................. *E04C 2/16* (2013.01); *B32B 7/12* (2013.01); *B32B 21/13* (2013.01); *B32B 37/06* (2013.01);
(Continued)

(58) Field of Classification Search
CPC ........... E04C 2/16; B32B 21/04; B32B 21/08; B32B 21/10; B32B 2419/00; B32B 2307/7376; B32B 2250/03; B32B 2317/16
See application file for complete search history.

(56) References Cited

U.S. PATENT DOCUMENTS

| | | | |
|---|---|---|---|
| 2,831,793 | A | 4/1958 | Elmendorf |
| 7,811,489 | B2 | 10/2010 | Pervan |

(Continued)

FOREIGN PATENT DOCUMENTS

| | | |
|---|---|---|
| CA | 2 210 558 A1 | 1/1999 |
| CN | 101787783 A | 7/2010 |
| GB | 2085357 A | 4/1982 |

OTHER PUBLICATIONS

U.S. Appl. No. 18/755,648, filed Jun. 26, 2024, Magnus Nilsson.

(Continued)

*Primary Examiner* — Joanna Pleszczynska
(74) *Attorney, Agent, or Firm* — Boone IP Law

(57) ABSTRACT

A building panel having a thickness after pressing, the building panel including a substrate, a first sub-layer including a binder arranged on a first side of the substrate and a surface layer including a first wood veneer, arranged on the first sub-layer, wherein the building panel has a thickness distribution of about ±7.5% or less, the thickness distribution defined by the formula: $((D_{max}-D_{min})/(D_{max}+D_{min}))\times 100$ and a method for producing a building panel.

21 Claims, 6 Drawing Sheets

(51) Int. Cl.

| | |
|---|---|
| *B32B 21/04* | (2006.01) |
| *B32B 21/08* | (2006.01) |
| *B32B 21/10* | (2006.01) |
| *B32B 21/13* | (2006.01) |
| *B32B 37/06* | (2006.01) |
| *B32B 37/10* | (2006.01) |
| *B32B 37/12* | (2006.01) |

(52) U.S. Cl.
CPC .......... *B32B 37/10* (2013.01); *B32B 37/1284* (2013.01); *B32B 2250/03* (2013.01); *B32B 2264/303* (2020.08); *B32B 2307/7376* (2023.05); *B32B 2309/02* (2013.01); *B32B 2309/04* (2013.01); *B32B 2309/12* (2013.01); *B32B 2317/16* (2013.01); *B32B 2379/00* (2013.01); *B32B 2419/00* (2013.01); *B32B 2479/00* (2013.01)

(56) References Cited

U.S. PATENT DOCUMENTS

| | | | |
|---|---|---|---|
| 8,302,367 | B2 | 11/2012 | Schulte |
| 8,349,234 | B2 | 1/2013 | Ziegler et al. |
| 8,349,235 | B2 | 1/2013 | Pervan et al. |
| 8,407,963 | B2 | 4/2013 | Schulte |
| 8,419,877 | B2 | 4/2013 | Pervan et al. |
| 8,431,054 | B2 | 4/2013 | Pervan et al. |
| 8,480,841 | B2 | 7/2013 | Pervan et al. |
| 8,481,111 | B2 | 7/2013 | Ziegler et al. |
| 8,499,520 | B2 | 8/2013 | Schulte |
| 8,617,439 | B2 | 12/2013 | Pervan et al. |
| 8,635,829 | B2 | 1/2014 | Schulte |
| 8,650,738 | B2 | 2/2014 | Schulte |
| 8,663,785 | B2 | 3/2014 | Ziegler et al. |
| 8,728,564 | B2 | 5/2014 | Ziegler et al. |
| 8,752,352 | B2 | 6/2014 | Schulte |
| 8,784,587 | B2 | 7/2014 | Lindgren et al. |
| 8,920,874 | B2 | 12/2014 | Ziegler et al. |
| 8,920,876 | B2 | 12/2014 | Vetter et al. |
| 8,993,049 | B2 | 3/2015 | Pervan |
| 9,085,905 | B2 | 7/2015 | Persson et al. |
| 9,109,366 | B2 | 8/2015 | Schulte |
| 9,181,698 | B2 | 11/2015 | Pervan et al. |
| 9,255,405 | B2 | 2/2016 | Pervan et al. |
| 9,296,191 | B2 | 3/2016 | Pervan et al. |
| 9,352,499 | B2 | 5/2016 | Ziegler et al. |
| 9,403,286 | B2 | 8/2016 | Vetter et al. |
| 9,410,319 | B2 | 8/2016 | Ziegler et al. |
| 9,556,622 | B2 | 1/2017 | Pervan et al. |
| 9,783,996 | B2 | 10/2017 | Pervan et al. |
| 10,017,950 | B2 | 7/2018 | Pervan |
| 10,100,535 | B2 | 10/2018 | Pervan et al. |
| 10,214,913 | B2 | 2/2019 | Persson et al. |
| 10,286,633 | B2 | 5/2019 | Lundblad et al. |
| 10,315,219 | B2 | 6/2019 | Jacobsson |
| 10,344,379 | B2 | 7/2019 | Pervan et al. |
| 10,364,578 | B2 | 7/2019 | Pervan |
| 10,392,812 | B2 | 8/2019 | Pervan |
| 10,442,152 | B2 | 10/2019 | Schulte |
| 10,442,164 | B2 | 10/2019 | Schulte |
| 10,493,729 | B2 | 12/2019 | Pervan et al. |
| 10,513,094 | B2 | 12/2019 | Persson et al. |
| 10,800,186 | B2 | 10/2020 | Pervan et al. |
| 10,828,881 | B2 | 11/2020 | Bergelin et al. |
| 10,857,765 | B2 | 12/2020 | Schulte |
| 10,899,166 | B2 | 1/2021 | Pervan et al. |
| 10,913,176 | B2 | 2/2021 | Lindgren et al. |
| 10,926,509 | B2 | 2/2021 | Schulte |
| 10,981,362 | B2 | 4/2021 | Ziegler et al. |
| 10,988,941 | B2 | 4/2021 | Ziegler et al. |
| 11,040,371 | B2 | 6/2021 | Jacobsson |
| 11,046,063 | B2 | 6/2021 | Persson et al. |
| 11,072,156 | B2 | 7/2021 | Schulte |
| 11,090,972 | B2 | 8/2021 | Persson et al. |
| 11,135,814 | B2 | 10/2021 | Pervan et al. |
| 11,167,533 | B2 | 11/2021 | Ziegler et al. |
| 11,235,565 | B2 | 2/2022 | Pervan et al. |
| 11,313,123 | B2 | 4/2022 | Pervan et al. |
| 11,318,726 | B2 | 5/2022 | Pervan et al. |
| 2009/0145066 | A1 | 6/2009 | Pervan |
| 2009/0155612 | A1 | 6/2009 | Pervan et al. |
| 2009/0218249 | A1 | 9/2009 | Stalter |
| 2010/0092731 | A1 | 4/2010 | Pervan et al. |
| 2010/0291397 | A1 | 11/2010 | Pervan et al. |
| 2010/0300030 | A1 | 12/2010 | Pervan et al. |
| 2010/0323187 | A1 | 12/2010 | Kalwa |
| 2011/0175251 | A1 | 7/2011 | Ziegler et al. |
| 2011/0177319 | A1 | 7/2011 | Ziegler et al. |
| 2011/0177354 | A1 | 7/2011 | Ziegler et al. |
| 2011/0189448 | A1 | 8/2011 | Lindgren et al. |
| 2011/0247748 | A1 | 10/2011 | Pervan et al. |
| 2011/0250404 | A1 | 10/2011 | Pervan et al. |
| 2011/0293906 | A1 | 12/2011 | Jacobsson |
| 2012/0124932 | A1 | 5/2012 | Schulte et al. |
| 2012/0263878 | A1 | 10/2012 | Ziegler et al. |
| 2012/0263965 | A1 | 10/2012 | Persson et al. |
| 2012/0264853 | A1 | 10/2012 | Ziegler et al. |
| 2012/0308774 | A1 | 12/2012 | Persson et al. |
| 2013/0092314 | A1 | 4/2013 | Zeigler et al. |
| 2013/0095315 | A1 | 4/2013 | Pervan et al. |
| 2013/0189534 | A1 | 7/2013 | Pervan et al. |
| 2013/0269863 | A1 | 10/2013 | Pervan et al. |
| 2013/0273244 | A1 | 10/2013 | Vetter et al. |
| 2013/0273245 | A1 | 10/2013 | Ziegler et al. |
| 2014/0044872 | A1 | 2/2014 | Pervan |
| 2014/0075874 | A1 | 3/2014 | Pervan et al. |
| 2014/0171554 | A1 | 6/2014 | Ziegler et al. |
| 2014/0178630 | A1 | 6/2014 | Pervan et al. |
| 2014/0186610 | A1 | 7/2014 | Pervan |
| 2014/0199558 | A1 | 7/2014 | Pervan et al. |
| 2014/0234531 | A1 | 8/2014 | Ziegler et al. |
| 2015/0017461 | A1 | 1/2015 | Lindgren et al. |
| 2015/0079280 | A1 | 3/2015 | Vetter et al. |
| 2015/0093502 | A1 | 4/2015 | Ziegler et al. |
| 2015/0111055 | A1 | 4/2015 | Persson et al. |
| 2015/0159382 | A1 | 6/2015 | Pervan |
| 2015/0197942 | A1 | 7/2015 | Pervan et al. |
| 2015/0197943 | A1 | 7/2015 | Ziegler et al. |
| 2015/0275526 | A1 | 10/2015 | Persson et al. |
| 2015/0298433 | A1 | 10/2015 | Kalwa |
| 2016/0031189 | A1 | 2/2016 | Pervan et al. |
| 2016/0114495 | A1 | 4/2016 | Pervan et al. |
| 2016/0186318 | A1 | 6/2016 | Pervan et al. |
| 2016/0230400 | A9 | 8/2016 | Pervan et al. |
| 2016/0368180 | A1 | 12/2016 | Ziegler et al. |
| 2016/0369507 | A1 | 12/2016 | Pervan et al. |
| 2016/0375674 | A1 | 12/2016 | Schulte |
| 2017/0120564 | A1 | 5/2017 | Schulte |
| 2017/0165936 | A1 | 6/2017 | Schulte |
| 2017/0190156 | A1 | 7/2017 | Lundblad et al. |
| 2017/0305119 | A1 | 10/2017 | Bergelin et al. |
| 2017/0348984 | A1 | 12/2017 | Pervan et al. |
| 2018/0002934 | A1 | 1/2018 | Pervan et al. |
| 2018/0147882 | A1 | 5/2018 | Hannig et al. |
| 2018/0291638 | A1 | 10/2018 | Pervan |
| 2018/0370278 | A1 | 12/2018 | Persson et al. |
| 2019/0010711 | A1 | 1/2019 | Pervan et al. |
| 2019/0202178 | A1 | 7/2019 | Ziegler |
| 2019/0210329 | A1* | 7/2019 | Ziegler .................. B32B 21/06 |
| 2019/0210330 | A1 | 7/2019 | Ziegler et al. |
| 2019/0277039 | A1 | 9/2019 | Håkansson et al. |
| 2019/0284821 | A1 | 9/2019 | Pervan |
| 2019/0292796 | A1 | 9/2019 | Pervan et al. |
| 2019/0338534 | A1 | 11/2019 | Pervan |
| 2020/0055287 | A1 | 2/2020 | Lundblad et al. |
| 2020/0078825 | A1 | 3/2020 | Jacobsson |
| 2020/0079059 | A1 | 3/2020 | Schulte |
| 2020/0094512 | A1 | 3/2020 | Schulte |
| 2020/0164622 | A1 | 5/2020 | Pervan et al. |
| 2020/0215799 | A1 | 7/2020 | Hedlund et al. |
| 2020/0223197 | A1 | 7/2020 | Hedlund et al. |
| 2021/0001647 | A1 | 1/2021 | Pervan et al. |
| 2021/0008863 | A1 | 1/2021 | Bergelin et al. |

(56) References Cited

U.S. PATENT DOCUMENTS

| | | |
|---|---|---|
| 2021/0078305 A1 | 3/2021 | Schulte |
| 2021/0101310 A1 | 4/2021 | Lindgren et al. |
| 2021/0197534 A1 | 7/2021 | Ziegler et al. |
| 2021/0277670 A1 | 9/2021 | Ziegler et al. |
| 2021/0323297 A1 | 10/2021 | Slottemo et al. |
| 2022/0009248 A1 | 1/2022 | Ryberg et al. |
| 2022/0024189 A1 | 1/2022 | Ziegler et al. |
| 2022/0024195 A1 | 1/2022 | Schulte |
| 2022/0063326 A1 | 3/2022 | Persson et al. |
| 2022/0176582 A1 | 6/2022 | Nilsson |

OTHER PUBLICATIONS

International Preliminary Report on Patentability received for PCT Patent Application No. PCT/SE20/050999, mailed on Apr. 28, 2022, 11 pages.
Supplementary European Search Report and Search Opinion received for EP Application No. 20877497.6, mailed on Oct. 11, 2023, 8 pages.
U.S. Appl. No. 18/914,474, filed Oct. 14, 2024, Göran Ziegler.
U.S. Appl. No. 17/768,022, filed Apr. 11, 2022, Rickard Rittinge.
U.S. Appl. No. 17/038,567, filed Sep. 30, 2020, Marcus Bergelin.
U.S. Appl. No. 17/090,511, filed Nov. 5, 2020, Guido Schulte.
U.S. Appl. No. 17/543,962, filed Dec. 7, 2021, Magnus Nilsson.
U.S. Appl. No. 17/697,417, filed Mar. 17, 2022, Göran Ziegler.
U.S. Appl. No. 17/711,487, filed Apr. 1, 2022, Darko Pervan.
U.S. Appl. No. 17/747,325, filed May 18, 2022, Göran Ziegler.
U.S. Appl. No. 18/047,755, filed Oct. 19, 2022, Guido Schulte.
U.S. Appl. No. 18/157,811, filed Jan. 20, 2023, Anette Hedlund.
U.S. Appl. No. 16/365,764, filed Mar. 27, 2019, Christer Lundblad.
U.S. Appl. No. 18/289,506, filed Nov. 3, 2023, Göran Ziegler.
U.S. Appl. No. 18/392,427, filed Dec. 21, 2023, Göran Ziegler.
Swedish Official Action issued by the Swedish Patent and Registration Office (PRV) in Swedish Patent Application No. 1930330-4 on Apr. 17, 2020 (13 pages).
U.S. Appl. No. 18/576,241, filed Jan. 3, 2024, Rickard Rittinge.
U.S. Appl. No. 18/576,294, filed Jan. 3, 2024, Rickard Rittinge.
U.S. Appl. No. 16/365,764, filed Mar. 27, 2019, Christer Lundblad, (Cited herein and US Patent Application Publication No. 2020/0055287 A of Feb. 20, 2020).
U.S. Appl. No. 16/738,334, filed Jan. 9, 2020, Anette Hedlund, (Cited herein and US Patent Application Publication No. 2020/0215799 A1 of Jul. 9, 2020).
U.S. Appl. No. 17/038,567, filed Sep. 30, 2020, Marcus Bergelin, (Cited herein and US Patent Application Publication No. 2021/0008863 A of Jan. 14, 2021).
U.S. Appl. No. 17/090,511, filed Nov. 5, 2020, Guido Schulte, (Cited herein and US Patent Application Publication No. 2021/0078305 A1 of Mar. 18, 2021).
U.S. Appl. No. 17/202,836, filed Mar. 16, 2021, Göran Ziegler, (Cited herein and US Patent Application Publication No. 2021/0197534 A1 of Jul. 1, 2021).
U.S. Appl. No. 17/205,469, filed Mar. 18, 2021, Göran Ziegler, (Cited herein and US Patent Application Publication No. 2021/0277670 A1 of Sep. 9, 2021).

U.S. Appl. No. 17/232,687, filed Apr. 16, 2021, Andreas Slottemo, (Cited herein and US Patent Application Publication No. 2021/0323297 A1 of Oct. 21, 2021).
U.S. Appl. No. 17/352,942, filed Jun. 21, 2021, Guido Schulte, (Cited herein and US Patent Application Publication No. 2022/0024195 A1 of Jan. 27, 2022).
U.S. Appl. No. 17/496,441, filed Oct. 7, 2021, Göran Ziegler, (Cited herein and US Patent Application Publication No. 2022/0024189 A1 of Jan. 27, 2022).
U.S. Appl. No. 17/543,962, filed Dec. 7, 2021, Magnus Nilsson, (Cited herein and US Patent Application Publication No. 2022/0176582 A1 of Jun. 9, 2022).
International Search Report/Written Opinion mailed Dec. 18, 2020 in PCT/SE2020/050999, Patent-och registreringsverket, Stockholm, SE, 15 pages.
Document D1—Ashawa Bay Hardwood Floors—Hardwood Floors Technical Specifications—Jul. 2018, 83 pages, Cook, MN—retrieved from the Internet: http://www.ashawabay.com/wp-content/uploads/2018/07/ashawa-bay-technical-manual-complete-2018.pdf.
Indexation of Document D1—hardwood floors—Ashawa Bay Flooring—on Google—1 page.
Document D3—Metsä wood spruce plywood manual [online], Sep. 14, 2017 (www.archive.org), [retrieved Dec. 3, 2020], 62 pages, Retrieved from the Internet https://web.archive.org/web/20170914005656/http://www.metsawood.com/global/Tools/MaterialArchive/MaterialArchive/Metsa-Wood-Spruce-Plywood-manual-English.pdf.
Indexation of Document D3—Metsä wood spruce plywood manual—Metsä Wood—Aug. 2016—64 pages https://web.archive.org/web/20170914005656/http://www.metsawood.com/global/Tools/MaterialArchive/MaterialArchive/Metsa-Wood-Spruce-Plywood-manual-English.pdf.
Document D4—Metsä wood birch plywood products [online], Sep. 14, 2017 (www.archive.org), [retrieved Dec. 3, 2020], 42 pages, Retrieved from the Internet: https://web.archive.org/web/20170914004631/http://www.metsawood.com/global/Tools/MaterialArchive/MaterialArchive/MetsaWood-Birch-plywood-datasheets-English.pdf.
Indexation of Document D4—Metsä Wood Birch Plywood Products—Metsä Wood Feb. 2017—44 pages https://web.archive.org/web/20170914004631/http://www.metsawood.com/global/Tools/MaterialArchive/MaterialArchive/MetsaWood-Birch-plywood-datasheets-English.pdf.
"5.10 Dimensional tolerances and squareness of panels," PS 1-95 Construction and Industrial Plywood, Mar. 1996, nine pages including p. 25, US Department of Commerce, Technology Administration, National Institute of Standards and Technology.
EWPAA—Facts about Particleboard and MDF, Feb. 2008, 41 pages, Australian Wood Panels Association Incorporated, AU.
Ziegler, Göran, et al., U.S. Appl. No. 17/697,417 entitled "Method to Produce a Building Panel and a Building Panel," filed Mar. 17, 2022.
Pervan, Darko, et al., U.S. Appl. No. 17/711,487 entitled "Wood Fibre Based Panel with a Surface Layer," filed Apr. 1, 2022.
Ziegler, Göran, et al., U.S. Appl. No. 17/747,325 entitled "Method of Producing a Veneered Element," filed May 18, 2022.
U.S. Appl. No. 18/741,549, filed Jun. 12, 2024, Daniel Scialanga.

* cited by examiner

Fig.1A
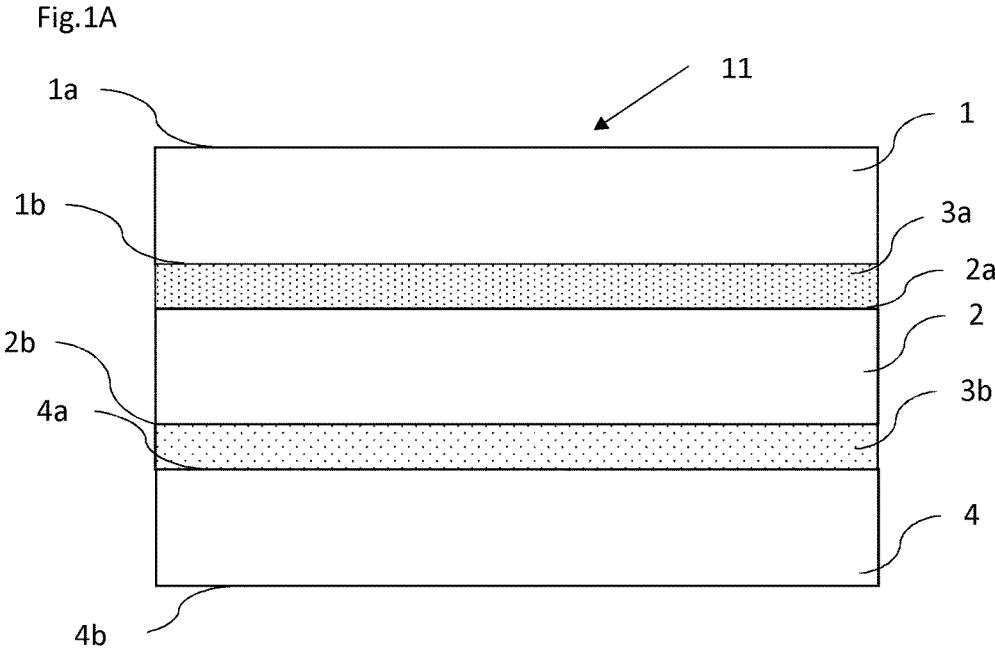
Fig.1B
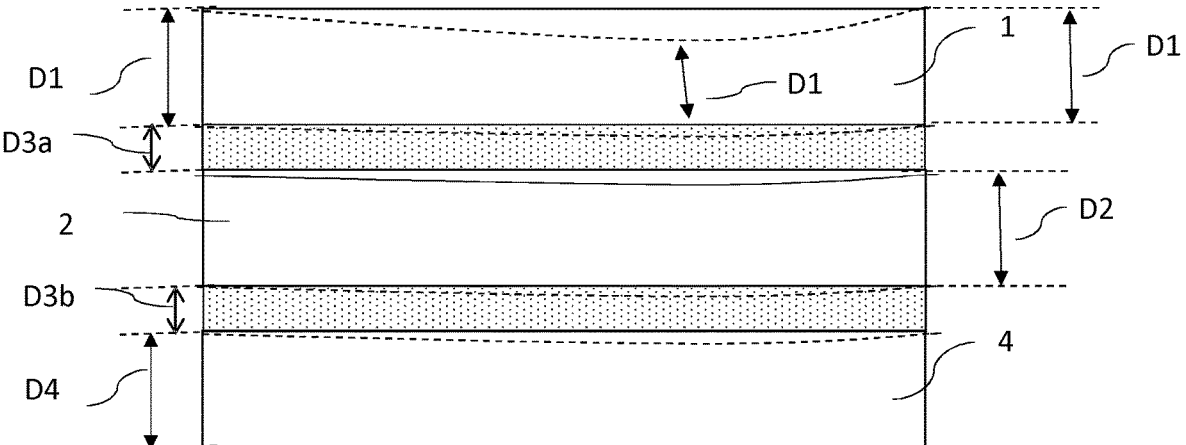
Fig. 1

WOOD FIBRE BASED PANEL AND A METHOD FOR OBTAINING SUCH PANEL

TECHNICAL FIELD

The disclosure generally relates but is not limited to the field of building panels with a surface layer comprising wood veneer, preferably floor panels, wall panels and furniture components.

TECHNICAL BACKGROUND

Embodiments of the invention are particularly suitable for use in floating floors, which are formed of floor panels with a surface layer comprising a wood veneer. The following description of known technique, problems of known systems and objects and features of the disclosure will therefore, as a non-restrictive example, be aimed above all at this field of application and in particular at floorings which are similar to traditional wood fibre based laminate floorings.

It should be emphasized that the embodiments of the invention can also be used in other applications as, for example, wall panels, ceilings, furniture components, and similar.

KNOWN TECHNIQUE AND PROBLEMS THEREOF

Several technologies are used to provide a floor panel comprising a wood veneer, which is similar to a solid floor panel. These panels may be produced more cost efficiently and a floor with a separate layer attached to a substrate of for example HDF, plywood or wood veneer is more moisture stable than solid wood floors.

Wood fibre based direct pressed laminated flooring usually comprises a core of a 6-12 mm fibre board, a 0.2 mm thick upper decorative surface layer of laminate and a 0.1-0.2 mm thick lower balancing layer of laminate, plastic, paper or like material.

A laminate surface generally comprises two paper sheets, a 0.1 mm thick printed decorative paper and a transparent 0.05-0.1 mm thick overlay intended to protect the decorative paper from abrasion. The transparent overlay, which is made of $\alpha$-cellulose fibres, comprises small hard and transparent aluminium oxide particles, which gives the surface layer a high wear resistance.

The printed decorative paper and the overlay are impregnated with melamine resin and laminated to a wood fibre based core under heat and pressure. The two papers have prior to pressing a total thickness of about 0.3 mm and they are after pressing compressed to about 0.2 mm.

Other common surface materials are wood veneer and foils, which are glued to a substrate. The surface may also be a powder layer comprising wood fibres, melamine resins, colour pigments and aluminium oxide particles.

Wood veneers may provide the most natural copies.

It is known that a wood veneer may be pressed on a powder layer as described above and that such a powder layer may provide increased impact resistance. This will not solve the cost problems.

U.S. Pat. No. 2,831,793 discloses a composite wood veneer panel. A thin veneer is applied to a composite fibrous core of ligno-cellulose particles and binder and openings of the veneer are filled with core material when pressed together to form the composite panel. In the manufacture of the plywood or veneered panels according to this document, the plugging of the surface layer opening defects is done simultaneously with the formation of the board.

SUMMARY

It is an object of certain aspects of the present invention to provide an improvement over the above described techniques and known art.

It is a further object of the invention to provide a panel with the improved surface properties.

It is a further object of the invention to minimise the costs of production of the building panel, by for example avoiding cutting any discolored parts or edges.

According to an aspect there is provided a building panel having a thickness (D) in a pressed state and comprising a substrate, a first sub-layer comprising a binder arranged on a first side of the substrate; and a surface layer comprising a first wood veneer, arranged on the first sub-layer, wherein the building panel has a thickness distribution of about ±7.5% or less, the thickness distribution defined by the formula: $((Dmax-Dmin)/(Dmax+Dmin))\times100$.

According to another aspect there is provided the building panel according to the previous aspect, further comprising a second sub-layer comprising a binder arranged on a second side of the substrate, said second side being opposite to the first side; and a balancing layer, comprising a second wood veneer arranged on the second sub-layer.

According to another aspect there is provided the building panel, wherein the substrate has a thickness D2 in a pressed panel and the thickness distribution is about ±7.5% or less; the thickness distribution defined by the formula:

$$\left((D2\max - D2\min)/(D2\max + D2\min)\right)\times100.$$

According to an aspect there is provided the building panel, wherein the surface layer has another thickness D1 in a pressed and the thickness distribution is about ±10% or less, the thickness distribution is defined by the formula $((D1max-D1min)/(D1max+D1min))\times100$.

According to another aspect there is provided the building panel, wherein the balancing layer has a thickness D4 in the pressed building panel and the thickness distribution is about ±10% or less, the thickness distribution is defined by the formula $((D4max-D4min)/(D4max+D4min)\times100$.

According to another aspect there is provided the building panel, wherein at least one of the first sub-layer (3a) and the second sub-layer (3b) has a thickness D3 in the pressed building panel and the thickness distribution is about ±12% or less, the thickness distribution is defined by the formula $((D3_{max}-D3_{min})/(D3_{max}+D3_{min}))\times100$.

According to another aspect there is provided the building panel, wherein the building panel has a thickness D in the pressed building panel of between 0.8 mm-20 mm, preferably 1-12 mm.

According to another aspect there is provided the building panel, wherein the substrate has a thickness D2 in the pressed building panel of between 1 mm and 15 mm.

According to another aspect there is provided the building panel, wherein the surface layer has a thickness D1 of between 0.2 mm and 2.5 mm.

According to another aspect there is provided the building panel, wherein the balancing layer has a thickness D4 of between 0.2 mm and 2.5 mm.

According to another aspect there is provided the building panel, wherein the first and/or the second surface layer each has a thickness D3 in the pressed building panel of between 0.05-0.40 mm.

According to another aspect there is provided the building panel, wherein the binder is in a powder form.

According to another aspect there is provided the building panel, wherein the first sub-layer and/or the second sub-layer comprise inorganic fillers.

According to another aspect there is provided the building panel, wherein the first sub-layer and/or the second sub-layer comprise fibres, preferably wood fibres.

According to another aspect there is provided the building panel, wherein the substrate is selected from a fibre based core and wood veneer.

According to another aspect there is provided the building panel, wherein the binder in the first and/or second sub-layer is thermoplastic or thermosetting binder.

According to another aspect there is provided the building panel, wherein the binder in the first sub-layer is the same or different from the binder of the second sub-layer.

According to another aspect there is provided the building panel, wherein the binder in the first and/or second sub-layer is a melamine formaldehyde resin.

According to another aspect there is provided the building panel, wherein the first and/or second sub-layer comprises a foaming agent.

According to another aspect there is provided the building panel, wherein the first wood veneer and/or second wood veneer is selected from oak, walnut, maple, pine, hickory, ash, fir, larch, beech and birch.

According to another aspect there is provided the building panel, wherein the building panel is selected from a floor panel, a wall panel or a furniture panel.

According to another aspect there is provided a method to produce a building panel, the method comprising: providing a substrate, scattering a powder comprising a binder on a first side of the substrate to obtain a first sub-layer; applying a first wood veneer on the first sub-layer to obtain a surface layer, optionally, scattering a powder comprising a binder on a second side of the substrate opposite the surface layer to obtain a second sub-layer, and applying a second wood veneer on the second sub-layer to obtain a balancing layer, wherein the powder comprising the binder is scattered on a side of the substrate opposite the surface; applying heat and external pressure to bond the surface layer, the first sub-layer and the substrate and optionally, a second sublayer and the balancing layer to obtain a building panel such that the building panel has a thickness D, wherein the thickness distribution in the pressed building panel is about ±7.5%, the thickness distribution defined by the formula:

$$((D_{max}-D_{min})/(D_{max}+D_{min}))\times100.$$

According to another aspect there is provided the method to produce a building panel, wherein the substrate has a thickness D2 in the pressed building panel and the thickness distribution of ±7.5% or less defined by the formula $((D2_{max}-D2_{min})/(D2_{max}+D2_{min}))\times100$.

According to another aspect there is provided the method to produce a building panel, wherein the surface layer has a thickness (D1) in the pressed building panel and a thickness distribution of ±10% or less defined by the formula: $((D1_{max}-D1_{min})/((D1_{max}+D1_{min}))\times100$.

According to another aspect there is provided the method to produce a building panel, wherein the balancing layer, when present, has a thickness D4 in the pressed building panel of with a thickness of ±10% or less distribution defined by the formula: $((D4_{max}-D4_{min})/(D4_{max}+D4_{min}))\times100$.

According to another aspect there is provided the method to produce a building panel, wherein at least one of the first sub-layer (3a) and the second sub-layer (3b) has a thickness D3 in the pressed building panel and the thickness distribution is about ±12% or less, the thickness distribution is defined by the formula $((D3_{max}-D3_{min})/(D3_{max}+D3_{min}))\times100$.

According to another aspect there is provided the method, wherein the powder comprising a binder further comprises inorganic fillers.

According to another aspect there is provided the method, wherein the powder comprising a binder further comprises fibres, preferably wood fibres.

According to another aspect there is provided the method, wherein the substrate is a fibre based core, preferably HDF board or veneer, preferably wood veneer.

According to another aspect there is provided the method, wherein the binder is thermoplastic or thermosetting binder.

According to another aspect there is provided the method, wherein the binder is a melamine formaldehyde resin.

According to another aspect there is provided the method, wherein the powder comprising a binder further comprises a foaming agent.

According to another aspect there is provided the method, wherein the first or the second wood veneer has a thickness of 0.2-2.5 mm, preferably 0.4-1 mm.

BRIEF DESCRIPTION OF THE DRAWINGS

These and other aspects, features and advantages of which embodiments of the invention are capable of, will be apparent and elucidated from the following description of embodiments and aspects of the present invention, reference being made to the accompanying drawings, to which a reference is made in the text.

FIG. 1A-B illustrates a building panel according to an embodiment of the invention, wherein the building panel comprises a surface layer, a substrate an optional balancing layer and a first and a second sub-layer. FIG. 1A shows a side view from a long edge of the panel, FIG. 1B shows a side view from a short edge of the panel.

FIG. 6A is a 0.8 mm surface veneer, FIG. 6B is a 0.6 mm surface veneer and FIG. 6C is 0.4 mm surface veneer.

DETAILED DESCRIPTION

Figure 2:
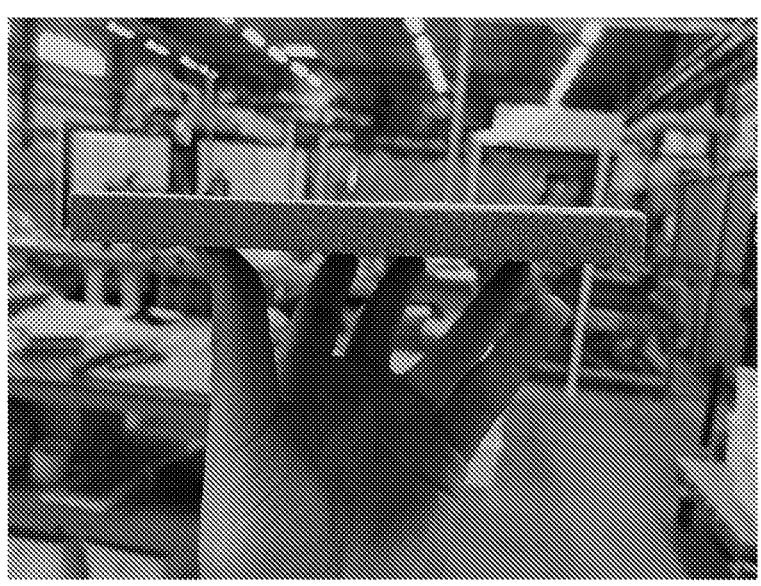
FIG. 2 illustrates a building panel with an uneven thickness distribution, occurred due to an uneven powder distribution.
Figure 3:
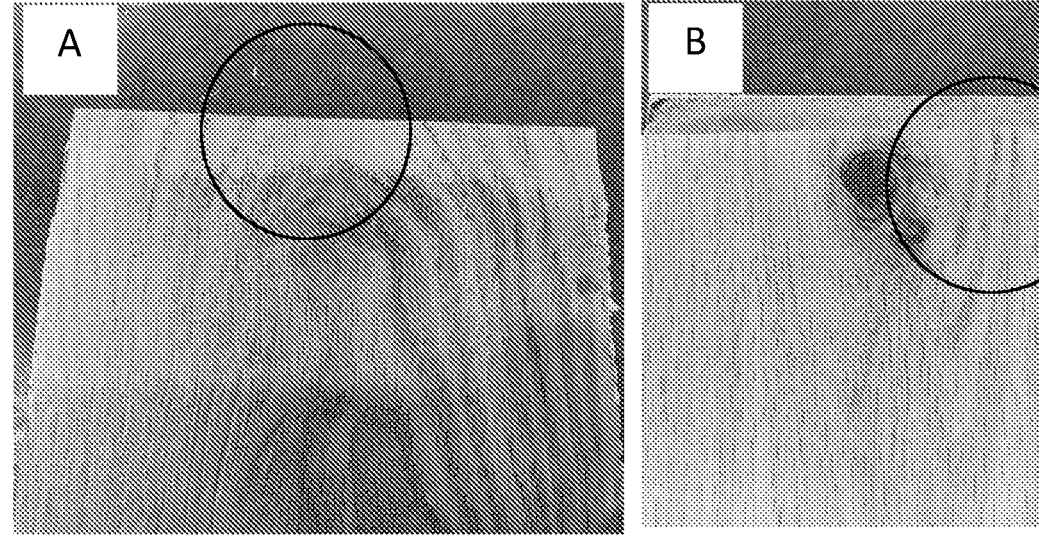
FIG. 3 illustrates a building panel wherein the undesired discoloration occurred due to the variation in the thickness of the building panel (2A) and no undesired discoloration has been observed (2B), when the thickness distribution was as defined by the claims.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise. It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example aspects may be implemented at least in part by means of both hardware and software, and that several "means", "units" or "devices" may be represented by the same item of hardware.

The different aspects, alternatives and embodiments of the invention disclosed herein can be combined with one or more of the other aspects, alternatives and embodiments described herein. Two or more aspects can be combined.

The objective of at least certain embodiments of the present invention is to provide a building panel, such as a floor panel, with a wood veneer based surface layer, which has a more attractive surface design and/or better surface properties and/or lower costs than present known floorings.

At least some of these and other objects and advantages that will be apparent from the description.

Sometimes the thickness of the building panel measured at various points of the panel length and/or width varies. When the thickness (D) of the building panel varies too much such as more than ±7.5%, a pressure, applied during assembling the building panel may be unevenly distributed over the entire surface area of the building panel. This may lead to a discoloring in some portions of the surface layer, visible as areas of a color lighter than the rest of the panel, which is herein is called a "waterfall tendency". Most obviously, such color variation may be observed at the edges of the building panel, and in particular at the short edges of the building panel. If such undesired color variation occurs in the middle of the panel the entire panel is typically discarded. If an undesired color variation occurred at the short edge of the panel, the edge may be cut away. This will make the panel shorter. Therefore, all other panels in a set shall be cut to the same size, which increases the production costs.

It shall be noted that "a waterfall" is observed as a discoloration on light colored wood veneers, such as oak. If a dark wood is used as a source of wood veneer, the discoloration may be less apparent. Nevertheless, the "waterfall" tendency is still observed. In such case the "waterfall" may be noted, because the surface veneer tends to disconnect from the core at the edges, in particular when the ready panel is transported or mounted on the target substrate, such as floor. In such case the panel with the bad attachment of the top veneer layer shall be put to waste. This also increase the production costs.

The present invention in one aspect defines the limits for the thickness distribution within the building panel and the individual elements of the building panel. If the thickness variation of each individual panel and/or at least one of the individual elements of the building panel is as defined herein and by the claims, the pressure is distributed evenly and no undesired discoloration occurs. Thus, the whole panel may be used thereby decreasing production costs.

In one aspect there is provided a building panel (11) having a thickness (D) and comprising: a substrate (2), a first sub-layer (3$a$) comprising a binder arranged on a first side (2$a$) of the substrate (2). A surface layer (1) comprising a first wood veneer, is arranged on the first sub-layer (3$a$). The building panel has a thickness D in the pressed building panel with a distribution of about ±7.5% or less, the thickness distribution defined by the formula $((D_{max} - D_{min})/(D_{max} + D_{min})) \times 100$. (FIG. 1A-1B).

A pressed panel is a building panel that has been at least partially cured under heat and/or pressure. The pressed building panel is thus a building panel after pressing.

In an embodiment, the substrate (2) may be a wood-based board, for example, a wood-fibre based board such as MDF or HDF, or plywood or wood veneer. The substrate may be a Wood Plastic Composite (WPC). In an embodiment, the substrate may be a mineral composite board, a fibre cement board, a magnesium oxide cement board, a ceramic board, or a plastic board such as a thermoplastic board. In an embodiment, a substrate (2) may be a veneer, preferably a wood veneer.

Preferably, the substrate is a pre-fabricated substrate.

In an embodiment, the fist sub-layer (3$a$) may comprise a filler and a binder. A filler and/or a binder are preferably in a powder form.

The binder in the first and/or second sub-layer may be an amino resin, such as melamine formaldehyde resin, urea formaldehyde resin, phenol formaldehyde resin, or a combination thereof.

The binder in the sub-layer may be a thermoplastic binder. The thermoplastic binder may be polyvinyl chloride (PVC), polyethylene (PE), polypropylene (PP), polyurethane (PU), polyvinyl alcohol (PVOH), polyvinyl butyral (PVB), and/or polyvinyl acetate (PVAc), or a combination thereof.

The binder may be wood mastic, wood filler or any other type of putty-like paste.

The fillers may be organic and comprise or consist of particles or fibres, for example wood fibres or particles, or mineral particles or fibres. The wood particles may be lignocellulosic particles and/or cellulosic particles. The wood particles may be at least partially bleached. The first and/or the second sub-layer may further comprise some organic fillers. The organic fillers may be rice, straw, corn, jute, linen, flax, cotton, hemp, bamboo, bagasse or sisal particles or fibres. The filler may be starch such as maize starch, potato starch, etc.

The surface layer may comprise a wood veneer, preferably formed by the wood veneer.

The surface layer (1) is adapted to be the outer layer of the building panel (11).

The building panel may be provided with a thinner wood veneer in the surface layer than known building panels with veneer, since the sub-layer reinforces the wood veneer.

The first wood veneer may also be pre-treated prior to pressing, for example, be brushed.

A thickness distribution is defined by the formula $((D_{max}-D_{min})/((D_{max}+D_{min})/)\times100$. A thickness is measured at different points of the building panel, such as 15 mm from the longitudinal edge of the building panel, or 15 mm from the latitudinal edge of the building panel.

When the thickness distribution of the thickness D is over ±7.5%, this results in an uneven panel which is not aesthetically attractive for a consumer. Furthermore, an uneven thickness the building panel may cause difficulties during installation and use. Therefore, it is beneficial to have a panel of the uniformed thickness. In particular, a panel having a uniformed thickness (D) obtained directly during assembling of the building panel under the heat and A large thickness distribution, more than ±7.5%, may be caused by the uneven thickness of the panel elements. When the panel element(s) with an uneven thickness are assembled under heat and pressure, the pressure is not distributed evenly inside the panel. This, in turn, may cause an uneven flow of the melted under the elevated temperature binder. When the binder distributed unevenly it penetrates unevenly into the wood veneer or substrate and causes an undesired discoloration of the surface layer.

The thickness of the building panel can be measured using a micrometer screw gauge with a measurement error of ±0.005 mm or for example by a Wolf RMU 30 Digital thickness gauge with the measure error of ±0.01 mm. In another aspect shown on FIG. 1A-B there is provided a building panel further comprising a second sub-layer (3b) comprising a binder arranged on a second side (2b) of the substrate (2). The second side (2b) being opposite to the first side (2a). The building panel (11) may be provided with a balancing layer (4), comprising a second wood veneer arranged on the second sub-layer (3b).

The first sub-layer (3a) may be the same or different from the second sub-layer (3b).

In one embodiment, the first sub-layer 3a and/or the second sub-layer 3b may be a pre-pressed layer, wherein the binder has not completely cured during the pre-pressing.

In one embodiment, a balancing layer (4) may be a wood-based board, for example, a wood-fibre based board such as MDF or HDF, or plywood or wood veneer. In an embodiment, a balancing layer (4) may be a veneer, preferably a wood veneer. A balancing layer (4) may be a low-quality wood veneer, because it will not be visible when the building panel is mounted on a target surface.

In an aspect, the substrate (2) has a thickness D2 in the pressed building panel and the thickness distribution is about ±7.5% or less. The thickness distribution defined by the formula: $((D2_{max}-D2_{min})/(D2_{max}+D2_{min}))\times100$. The thickness of the substrate may be assessed visually followed by the measurement for example Wolf RMU 30 Digital thickness gauge with the measure error of ±0.01 mm. The substrates, may have thickness distribution of no more than ±7.5%. If the thickness distribution is more, than a variation in the thickness of the building panel would more than ±7.5%, which would lead to undesired discoloring of the building panel.

In another aspect, the surface layer (1) has a thickness D1 in the pressed building panel and the thickness distribution is about ±10% or less, the thickness distribution is defined by the formula $((D1_{max}-D1_{min})/(D1_{max}+D1_{min}))\times100$.

In another aspect the balancing layer (4) has a thickness D4 in the pressed building panel and the thickness distribution is about ±10% or less, the thickness distribution is defined by the formula $((D4_{max}-D4_{min})/(D4_{max}+D4_{min}))\times100$.

In another aspect, the first and/or second sub-layer (3a, 3b)) has a thickness D3 in the pressed building panel and the thickness distribution is about ±12% or less, the thickness distribution is defined by the formula $((D3_{max}-D3_{min})/(D3_{max}+D3_{min}))\times100$.

In an embodiment of the invention, the thickness distribution of the building panel may be improved by at least one of the following: providing the surface layer (1) with an acceptable thickness distribution as defined herein, the first and/or the second sub-layer (3a, 3b) with an acceptable thickness distribution as defined herein, the substrate (1) or balancing layer (4), when present with an acceptable thickness distribution as defined herein.

In an aspect, the acceptable thickness distribution of the building panel (11) ±7.5% or less in the pressed state (after pressing) may be obtained by combining two or more of surface layer (1), the first and/or the second sub-layer (3a, 3b), the substrate (1) and balancing layer (4) with the acceptable thickness distribution in accordance with some embodiments of the invention.

In an aspect, the building panel (11) has a thickness D of between 0.8 mm-20 mm, preferably 1-12 mm. A thin panel preferably has a thickness of between 1 to 7 mm, preferably between 2 to 6, preferably between 3 to 6. Some thicker panels may be between 6 to 10 mm, preferably between 7 to 9, preferably between 10 to 12.

In an aspect, the substrate (2) has a thickness D2 in the pressed building panel of between 1 mm and 15 mm, such as between 2 and 14, such as between 3 and 13, such has between 5 and 12, such as between 10 and 11.

In an aspect, the building panel has a surface layer (1), which may have a thickness D1 in the pressed building panel of between 0.2 mm and 2.5 mm, preferably between 0.4 mm and 1 mm.

In an aspect, the balancing layer (4) has a thickness D4 in the pressed building panel of between 0.2 mm and 2.5 mm, preferably between 0.5 mm and 2 mm, between 0.7 mm and 1.5 mm.

In an aspect, the first and/or the second sub-layer each has a thickness in the pressed building panel (D3a, D3b) of between 0.05-0.4 mm.

In an aspect, the binder is in a powder form.

The first sub-layer (3a) and/or the second sub-layer (3b) may comprise inorganic fillers. The inorganic filler may be barium sulfate or calcium carbonate.

The first sub-layer (3a) and/or the second sub-layer (3b) may comprise fibres, preferably wood fibres.

The substrate may be selected from a fibre based core and wood veneer.

The binder in the first and/or second sub-layer (3a, 3b) may be a thermoplastic or thermosetting binder. The first and/or second sub-layer (3a, 3b) may be the same binder or the different binder, such as the first sub-layer 3a may comprise a thermoplastic binder and the second sub-layer may comprise a thermosetting binder.

The binder may be selected from urea-formaldehyde and/or melamine formaldehyde resin, preferably in the powder form.

The first and/or second sub-layer (3a, 3b) may comprise a foaming agent.

The first wood veneer and/or second wood veneer may be selected from oak, walnut, maple, pine, hickory and birch.

The building panel may be selected from a floor panel, a wall panel or a furniture panel.

All the aspects described above are equally applicable to the method for producing a building panel.

In an embodiment, a method to produce a building panel (11) comprises: providing a substrate (2), scattering a powder comprising a binder on a first side (2a) of the substrate (2), to obtain a first sub-layer (3a); applying a first wood veneer on the first sub-layer (3a) to obtain a surface layer (1), optionally, scattering a powder comprising a binder on a second side (2b) of the substrate opposite the surface layer (1) to obtain a second sub-layer (3b), and applying a second wood veneer on the second sub-layer (3b) to obtain a balancing layer (4), wherein the powder comprising the binder is scattered on a side of the substrate opposite the surface; applying heat and external pressure to bond the surface layer (1), the first sub-layer (3a) and the substrate (2) and optionally, a second sublayer (3b) and the balancing layer (4) to obtain a building panel (11) such that the building panel has a thickness D after applying heat and pressure, wherein the thickness distribution is about ±7.5% or less in the pressed building panel, the thickness distribution defined by the formula: $((D_{max}-D_{min})/(D_{max}+D_{min}))\times100$. The thickness distribution D of the building panel and as defined by the claims may be achieved by providing individual elements of the panel in accordance with some embodiments of the invention.

In accordance with an embodiment a thickness distribution of the powder layer thickness (D) may be achieved by the positioning of the surface layer (1) relative the substrate (2) and the balancing layer (4) when present.

In an embodiment, the substrate (2) may a thickness D2 in the pressed building panel and the thickness distribution of ±7.5% or less defined by the formula $((D2_{max}-D2_{min})/((D2_{max}+D2_{min}))\times100$. Thereby the thickness distribution of the thickness D of the building panel may be between 0.8 and 20 mm in the pressed building panel.

In an embodiment, the surface layer (1) may have a thickness (D1) in the pressed building panel and a thickness distribution of ±7.5% or less defined by the formula: $((D1_{max}-D1_{min})/((D1_{max}+D1_{min}))\times100$.

In an embodiment, at least one of the first sub-layer (3a) and the second sub-layer (3b) has a thickness D3 in the pressed building panel and the thickness distribution is about ±12% or less, the thickness distribution is defined by the formula $((D3_{max}-D3_{min})/(D3_{max}+D3_{min})\times100$.

The sub-layer 3 may be applied in an amount of 200-600 g/m2, preferably 300-500 g/m2, such as between 420-470 g/m2, such as between 500-550 g/m2, such as about 400 g/m2. The amount of binder applied for the sub-layer 3 may be 100-300 g/m2, preferably 150-250 g/m2 such as about 200 g/m2. The binder is preferably applied as a powder.

In an embodiment the balancing layer (4), when present, has a thickness D4 10% or less in the pressed building panel with a thickness distribution defined by the formula: $((D4_{max}-D4_{min})/(D4_{max}+D4_{min}))\times100$.

In some aspects, an even distribution may be achieved by scattering. In some embodiments, an even distribution may be achieved by providing an 200 g/m$^2$ to 600 g/m$^2$ of the first and/or second sub-layer (3a, 3b), preferably in a powder form.

In an aspect, the thickness distribution of no more ±15% is achieved by an even scattering of the powder on the substrate.

A maximal deviation in the amount of powder scattered, such as in grams, may be within +/−13%

The scattering may be carried out by means of a scattering device. The amount of scattered powder may controlled by feeding a plurality of devices configured to collect powder passed the scattering device, and measuring the amount of powder scattered.

The devices each has a predetermined area for receiving powder from the scattering device. In one embodiment the powder collectors comprise cups or cup-like devices.

The amount of powder scattered may be controlled by measuring the amount of powder received in the plurality of devices. Based on the measuring the scattering device may be configured such that a maximal deviation, such as in relation an intended or desired amount, in the amount of powder scattered, such as in grams, is within +/−13%.

In an embodiment, a discontinued press is used. In a preferred embodiment, a continued press is used to provide a thickness distribution of ±15% or less of the building panel after pressing.

In an embodiment, a thickness distribution of 0.5 mm in the building panel after pressing is due to the positioning of the surface layer relative substrate and/or balancing layer.

Figure 4:
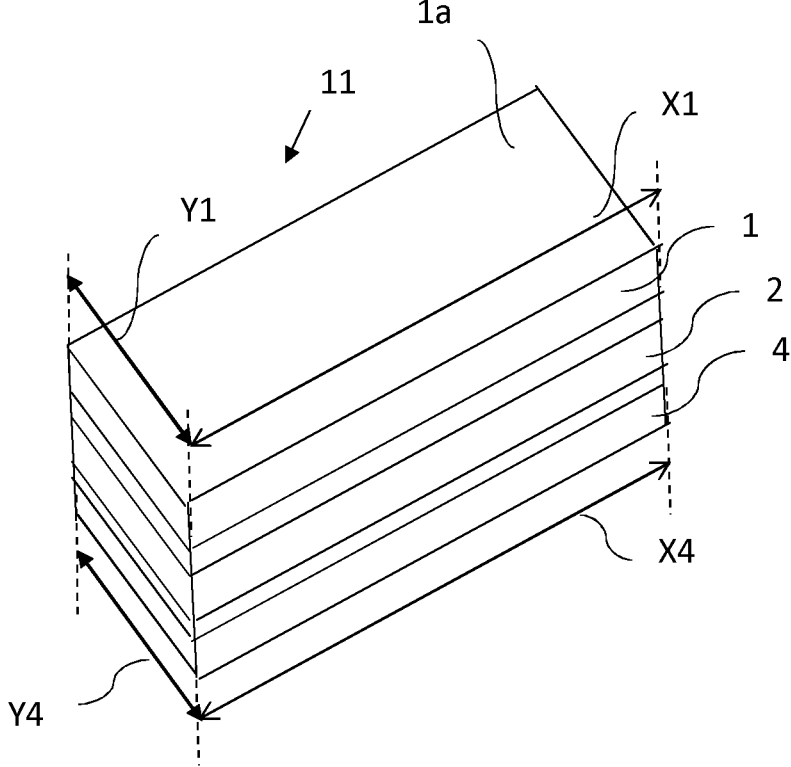
FIG. 4 illustrates a 3D view of the building panel, wherein the Length (X) and the width (Y) of the surface layer and the balancing layer are defined.

In an embodiment, a building panel (11) comprises a balancing layer (4) comprising a first wood veneer having a length (X4) measured along a longitudinal edge of the building panel and a length (Y4) measured along a latitudinal edge of the first wood veneer, a top surface (4a) and a bottom surface (4b), a first sub-layer (3a) comprising a binder and arranged on the top surface (4a) of the balancing layer (4). A surface layer (1) comprising a second wood veneer and arranged on top of the first sub-layer (3a); said surface layer (1) having a length (X1) measured along a long edge of the building panel and a width (Y1) measured along a latitudinal edge of the building panel, a top surface (1a) and a bottom surface (1b); the bottom surface (4a) of the balancing layer (4) is configured to be mounted on a target surface suitable for covering with the building panel (11) and the top surface (1a) of the surface layer (1) is configured to be an outer surface of the building panel (11), wherein the width (X1) of the surface layer (1) is essentially equal to the width (X4) of the balancing layer (4). The length (Y1) of the surface layer (1) is equal or less the length (Y4) of the balancing layer (4) and the surface layer (1) is positioned on the first sub-layer (3a) such that the short and the long edges of the surface layer (1) do not extend beyond the corresponding short and long edges of the balancing layer (4) (FIG. 4).

Figure 5:
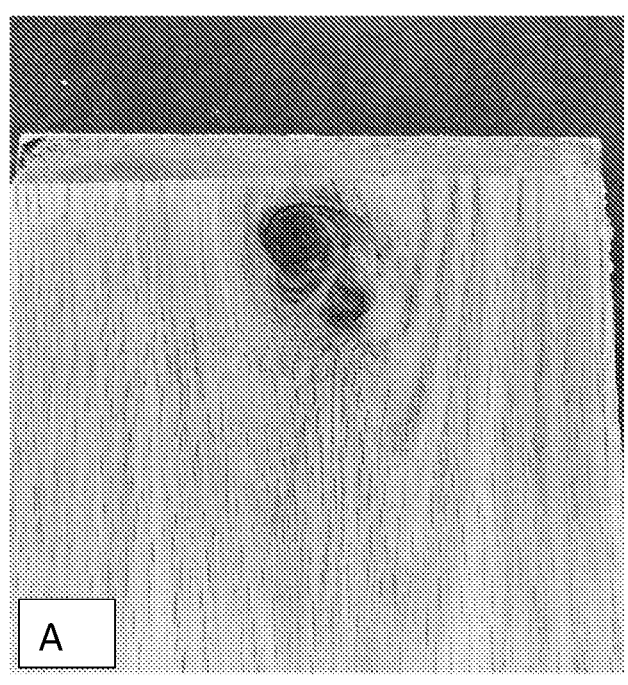
FIG. 5 illustrates a correct positioning of the first veneer relative second veneer in the building panel. On FIG. 5A the short edge of the first wood veneer is positioned in line with the short edge of the board and in line with the short edge of the second wood veneer. On FIG. 6B both the first wood veneer and the second wood veneer are positioned such that their short edged are of set inward the board by 5 mm respectively. The short edge of the first wood veneer and the second wood veneer are thereby aligned with each other but not with the short edge of the board.
Figure 5:
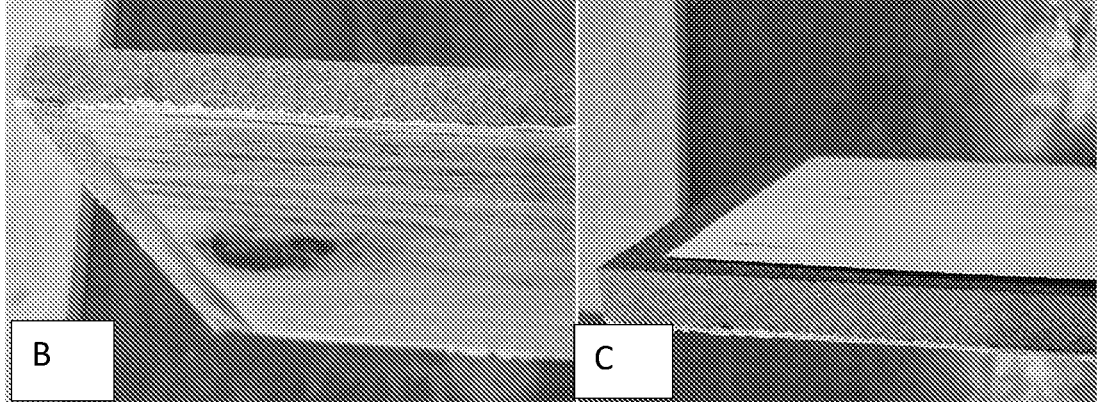

FIG. 5 shows correct positioning of the surface layer comprising wood veneer. When the veneer is position as on FIG. 5, the thickness of the pressed building panel has a thickness distribution of no more than ±7.5% as defined by the claims and no undesired colour variation occurs (FIG. 5A-B).

FIG. 6A shows positioning of the panel layers aligned along the short edge (FIG. 6A) and positioning of the wood veneers displaced at a similar distance from the short edge of the building element (FIG. 6B). In both embodiments 6A and 6B no undesired discoloration occurs.

By the way of an example, both wood veneers are displaced by 5 mm from the short edge of the building element.

The building panel may further contain a protective layer, applied on a top surface 1a of the surface layer 1.

Using a protective overlay with wear resistant particles applied on the veneer is not excluded and this could increase the wear resistance of a wood veneer. Dry and wet overlays, which are produced by production methods where for example thermosetting resins in dry or wet form are mixed with aluminium oxide, without any fibres could also be used. Aluminium oxide particles mixed with melamine powder could for example be applied on a wood veneer prior to pressing and a wear resistant surface could be obtained without any surface coating after pressing. Dry and wet overlays may be applied on the surface layer prior to pressing. Wax may be applied, for example, as a powder, prior to pressing on the veneer. A lacquer may also be applied on the surface layer after pressing. A protective foil may also be applied on the veneer prior to pressing or on the surface layer after pressing.

In any embodiment, the method may comprise selecting said wood veneer to have a maximum thickness distribution of +/−9%.

In any embodiment, the particle size of the powder may be in the range of 0-800 micron, preferably 0-600 micron, more preferably below 300 micron.

In any embodiment, the amount of powder may be in the range of 50-750 g/m², preferably 100-600 g/m², more preferably 250-550 g/m².

In any embodiment, the pressure applied may be in the range of 20-80 bar, preferably 30-70 bar, more preferably 40-60 bar.

In any embodiment, the press temperature is in the range of 90-180° C., preferably 100-170° C., more preferably 110-160° C.

In any embodiment, the press-time may be in the range of 15-60 seconds, preferably 20-50 seconds, more preferably 25-40 seconds.

In any embodiment, the thickness of the veneer prior the press may be measured by means of a micrometer.

EXAMPLES

Thickness Variations of Specimen with Different Veneer Thickness and Powder Amounts

TABLE 1

| Materials used in all examples | |
| --- | --- |
| Powder ingredients | Powder mix (wt %) |
| Wood powder | 43 |
| Melamine-Formaldehyde binder | 52.5 |
| Inorganic fillers | 4.5 |

The veneers used were oak veneers of various thicknesses.

The substrate used was a 10 mm High Density Fiber (HDF) board.

Melamine-formaldehyde binders and inorganic fillers were in a powder form, such as a powder mix.

Example 1

Figure 7:
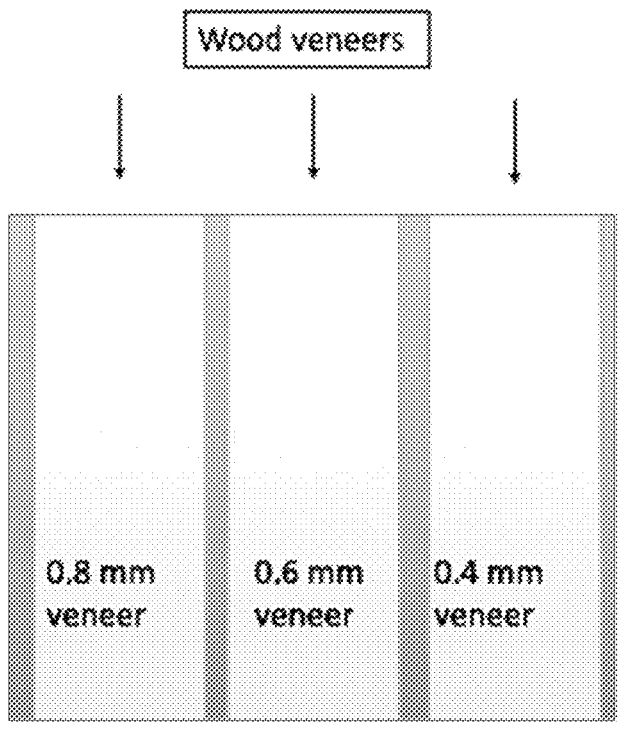
FIG. 7 illustrates an example of an experiment setup.

Three substrates were scattered with 300, 400 and 500 g/m2 powder respectively. Three veneers with different thickness were then placed on top of each substrate, according to FIG. 7 so that 9 veneered samples were produced in three pressings, presented in Table 1. FIG. 7 illustrates an experiment setup with veneers of different thickness on the same substrate scattered with 400 g/m2 Powder mix.

The specimens (building panels) were balanced with a birch veneer and a balancing powder layer on the backside and heat pressed. The building panel thicknesses were then measured and related to their respective veneer thickness in the surface layer and powder amount. This was made in order to show a measuring method relating veneer and powder layer thickness post pressing to the initial veneer thickness and powder amount (g/m2).

| Pressing 1 | Pressing 2 | Pressing 3 |
| --- | --- | --- |
| 300 g/m2 powder and 0.4 mm veneer | 400 g/m2 powder and 0.4 mm veneer | 500 g/m2 powder and 0.4 mm veneer |
| 300 g/m2 powder and 0.6 mm veneer | 400 g/m2 powder and 0.6 mm veneer | 500 g/m2 powder and 0.6 mm veneer |
| 300 g/m2 powder and 0.8 mm veneer | 400 g/m2 powder and 0.8 mm veneer | 500 g/m2 powder and 0.8 mm veneer |

Figure 6:
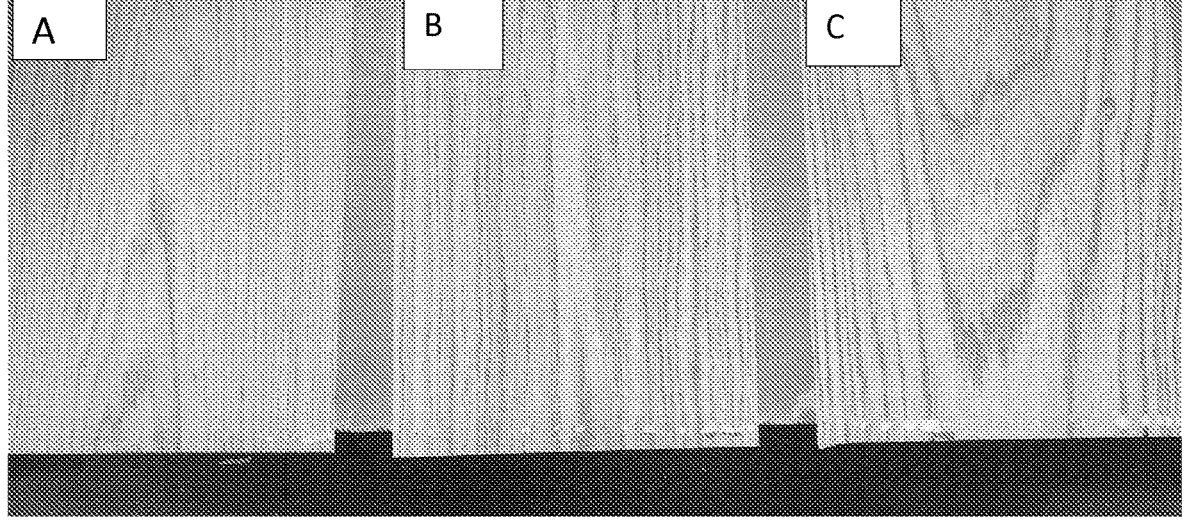
FIG. 6 illustrates an increased pearling of the binder over the pressed element from thicker to thinner veneers

A visual inspection of the samples after press revealed that the waterfall tendencies began to show already when the initial veneer thickness deviated by 0.2 mm and even more so when deviating 0.4 mm. When the waterfall tendency is increased, there was also a higher amount of binder pearling on the substrate edge, both below and on top of the veneers, which was obviously to a lesser degree used to penetrate and glue the veneer and is thereby very closely related to waterfall tendencies. The phenomenon is shown in FIG. 6.

The measured data of the building element thickness versus veneer thickness and powder amount is shown in Table 2. The values are an average of 3 measurements, all measured roughly 10 cm from the short edge of the building panel located as following:

Point 1: 15 mm from the fist veneer long edge
Point 2: the center between veneer long edges
Point 3: 15 mm from the second veneer long edge

TABLE 2

| Mean thickness of the building element with different veneer thickness and powder amounts. | | | | |
| --- | --- | --- | --- | --- |
| Mean thickness values of whole specimen | | Veneer thickness | | |
| | | 0.8 mm | 0.6 mm | 0.4 mm |
| Powder amount | 500 g/m2 | 11.35 | 11.20 | 11.07 |
| | 400 g/m2 | 11.29 | 11.15 | 11.01 |
| | 300 g/m2 | 11.20 | 11.11 | 10.94 |

The measured correlation of the layers pre- and post press are as follows. In Table 3 it can be calculated that when increasing the initial veneer thickness by 0.2 mm, the specimen increased its thickness by an average of 0.14 mm. When increasing the powder amount with 100 g/m2 the specimen increased its thickness by an average of 0.06 mm.

TABLE 3

| From data in Table 2, a height difference of the pressed specimen due to different veneer thicknesses or powder amounts were calculated. | | | |
| --- | --- | --- | --- |
| Height difference of specimen due to veneer thickness | | 0.8 mm veneer vs. 0.6 mm veneer | 0.6 mm veneer vs. 0.4 mm veneer |
| Powder amount | 500 g/m2 | 0.15 | 0.13 |
| | 400 g/m2 | 0.13 | 0.15 |
| | 300 g/m2 | 0.09 | 0.18 |
| Height difference of specimen due to powder amount | | 500 g/m2 vs. 400 g/m2 | 400 g/m2 vs. 300 g/m2 |
| Veneer thickness | 0.8 mm | 0.06 | 0.08 |
| | 0.6 mm | 0.04 | 0.04 |
| | 0.4 mm | 0.06 | 0.07 |

Example 2

Figure 8:
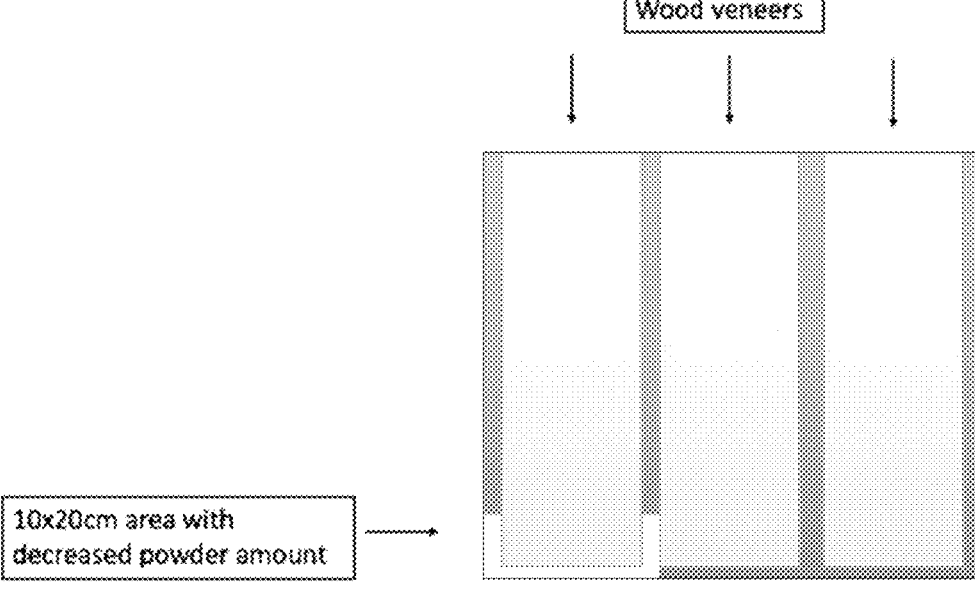
FIG. 8 illustrates another example of an experiment setup.

Three substrates were scattered according to FIG. 8, where the lower left corner of 10×20 cm had a lower powder amount than the rest of the board, creating a deviation in powder amount and thereby layer thickness. FIG. 8 illustrates an experiment setup with 3 0.6 mm thick veneers, 600 g/m2 powder amount (Powder X), except for the lower left corner, where there was only 300 g/m2 powder.

The deviation was decreased for every sample until the press result did not generate a visual waterfall and the setups were as follows:

Sample 1: 500 to 200 g/m2 difference, illustrating a distribution of ±43% of either the initial powder amount, or of the pressed powder layer thickness.

Sample 2: 500 to 300 g/m2 difference, illustrating a distribution of ±25% of either the initial powder amount, or of the pressed powder layer thickness.

Sample 3: 500 to 400 g/m2 difference, illustrating a distribution of ±10% of either the initial powder amount, or of the pressed powder layer thickness.

These differences were calculated to a distribution using the formula:

$$(D\text{max} - D\text{min})/(D\text{max} + D\text{min}) \times 100$$

Three 0.6 mm thick wood veneers were then placed on top.

Visual waterfalls were induced at both sample 1 and 2, but not in sample 3, showing that the maximum deviation in powder layer thickness is between 10 and 25%. The example is clearly showing that in order to guarantee no waterfall tendencies, the distribution should be about 10% or below.

Example 3

The substrates from example 1 were inspected using a light optical microscope in order to measure thickness of the individual layers. This was performed in order to calculate the maximum layer thickness deviation allowed to avoid waterfall tendencies.

The measured thicknesses are shown in Table 4 and Table 5. The veneer layer increased by an average of 0.12 mm when the initial thickness was increased by 0.2 mm. The powder layer increased on average by 0.06 mm when increasing the powder amount by 100 g/m2. Both values correlate well with measurements in example 1 and represent roughly the upper limit of the layer thickness deviation where waterfall tendencies begin to show up.

TABLE 4

Measured veneer thickness after press correlated to the initial veneer thickness (horizontal header) and powder amount (vertical header).

|  | 0.8 mm | 0.6 mm | 0.4 mm |
|---|---|---|---|
| 500 g/m2 | 0.45 | 0.3 | 0.24 |
| 500 g/m2 | 0.5 | 0.35 | 0.24 |
| 500 g/m2 | 0.45 | 0.35 | 0.25 |
| 400 g/m2 | 0.5 | 0.3 | 0.24 |
| 400 g/m2 | 0.5 | 0.4 | 0.25 |
| 400 g/m2 | 0.5 | 0.35 | 0.26 |
| 300 g/m2 | 0.45 | 0.35 | 0.26 |
| 300 g/m2 | 0.5 | 0.34 | 0.26 |
| 300 g/m2 | 0.5 | 0.36 | 0.26 |
| Mean veneer thickness after press | 0.48 | 0.34 | 0.25 |

TABLE 5

Measured powder layer thickness after press correlated to the initial veneer thickness (horizontal header) and powder amount (vertical header).

|  | Measured thickness of powder layer | | | Mean powder layer thickness |
|---|---|---|---|---|
|  | 0.8 mm | 0.6 mm | 0.4 mm | after press |
| 500 g/m2 | 0.25 | 0.24 | 0.25 | At 500 g/m2 |
| 500 g/m2 | 0.26 | 0.23 | 0.25 | 0.25 |
| 500 g/m2 | 0.24 | 0.25 | 0.26 |  |
| 400 g/m2 | 0.2 | 0.2 | 0.23 | At 400 g/m2 |
| 400 g/m2 | 0.2 | 0.2 | 0.23 | 0.20 |
| 400 g/m2 | 0.18 | 0.2 | 0.2 |  |
| 300 g/m2 | 0.13 | 0.14 | 0.13 | At 300 g/m2 |
| 300 g/m2 | 0.13 | 0.13 | 0.13 | 0.13 |
| 300 g/m2 | 0.12 | 0.13 | 0.14 |  |

The invention claimed is:

1. A building panel, which was formed by pressing, the panel comprising:

a substrate, a first sub-layer comprising a binder arranged on a first side of the substrate; and a surface layer comprising a first wood veneer, arranged on the first sub-layer, wherein the building panel has a thickness D with a thickness distribution $D_{distr}$ of ±7.5% or less, the thickness distribution $D_{distr}$ being defined by the formula:

$$D_{distr} = \left((D_{max} - D_{min})/(D_{max} + D_{min})\right) \times 100.$$

wherein the surface layer has a thickness D1, and the thickness D1 has a thickness distribution $D1_{distr}$ of about ±10% or less, the thickness distribution $D1_{distr}$ being defined by the formula: $D1_{distr}=((D1_{max}-D1_{min})/(D1_{max}+D1_{min}))\times100$.

2. The building panel according to claim 1, further comprising:

a second sub-layer comprising a binder arranged on a second side of the substrate, said second side being opposite to the first side; and a balancing layer, comprising a second wood veneer arranged on the second sub-layer.

3. The building panel according to claim 1, wherein the substrate has a thickness D2, and the thickness D2 has a thickness distribution $D2_{distr}$ of about ±7.5% or less, the thickness distribution $D2_{distr}$ being defined by the formula: $D2_{distr}=((D2_{max}-D2_{min})/(D2_{max}+D2_{min}))\times100$.

4. The building panel according to claim 2, wherein the balancing layer has a thickness D4 and the thickness D4 has a thickness distribution $D4_{distr}$ of about +10% or less, the thickness distribution $D4_{distr}$ being defined by the formula: $D4_{distr}=((D4_{max}-D4_{min})/(D4_{max}+D4_{min})\times100$.

5. The building panel according to claim 2, wherein at least one selected from the first sub-layer and the second sub-layer has a thickness D3, and the thickness D3 has a thickness distribution $D3_{distr}$ ±12% or less, the thickness distribution $D3_{distr}$ being defined by the formula: $D3_{distr}=((D3_{max}-D3_{min})/(D3_{max}+D3_{min}))\times100$.

6. The building panel according to claim 1, wherein the building panel has a thickness of between 0.8 mm-20 mm.

7. The building panel according to claim 1, wherein the substrate has a thickness of between 1 mm and 15 mm.

8. The building panel according to claim 1, wherein the surface layer has a thickness of between 0.2 mm and 2.5 mm.

9. The building panel according to claim 2, wherein the balancing layer has a thickness of between 0.2 mm and 2.5 mm.

10. The building panel according to claim 2, wherein the first and/or the second sub-layer each have a thickness of between 0.05-0.40 mm.

11. The building panel according to claim 1, wherein the binder is in a powder form.

12. The building panel as claimed in claim 2, wherein the first sub-layer and/or the second sub-layer comprise an inorganic filler.

13. The building panel as claimed in claim 2, wherein the first sub-layer and/or the second sub-layer comprise fibres.

14. The building panel according to claim 1, wherein the substrate is selected from a fibre based core and wood veneer.

15. The building panel according to claim 2, wherein the binder in the first and/or second sub-layer is thermoplastic or thermosetting binder.

16. The building panel according to claim 2, wherein the binder in the first sub-layer is the same or different from the binder of the second sub-layer.

17. The building panel according to claim 2, wherein the binder in the first and/or second sub-layer is a melamine formaldehyde resin.

18. The building panel as claimed in claim 2, wherein the first and/or second sub-layer comprises a foaming agent.

19. The building panel as claimed in claim 2, wherein the first wood veneer and/or second wood veneer is selected from oak, walnut, maple, pine, hickory and birch.

20. The building panel according to claim 1, wherein the building panel is selected from a floor panel, a wall panel or a furniture panel.

21. A building panel, which was formed by pressing, the panel-comprising:

a substrate, wherein the substrate is a High Density Fiber (HDF) or Medium Density Fiber (MDF) board, a first sub-layer comprising a binder arranged on a first side of the substrate; and a surface layer comprising a first wood veneer, arranged on the first sub-layer, wherein the building panel has a thickness D with a thickness distribution $D_{distr}$ of ±7.5% or less, the thickness distribution $D_{distr}$ being defined by the formula:

$$D_{distr} = ((D_{max} - D_{min})/(D_{max} + D_{min})) \times 100.$$

\* \* \* \* \*